March 22, 1927. 1,621,657
C. G. COOPER ET AL
GREASE GUN
Filed July 14, 1924 3 Sheets-Sheet 2
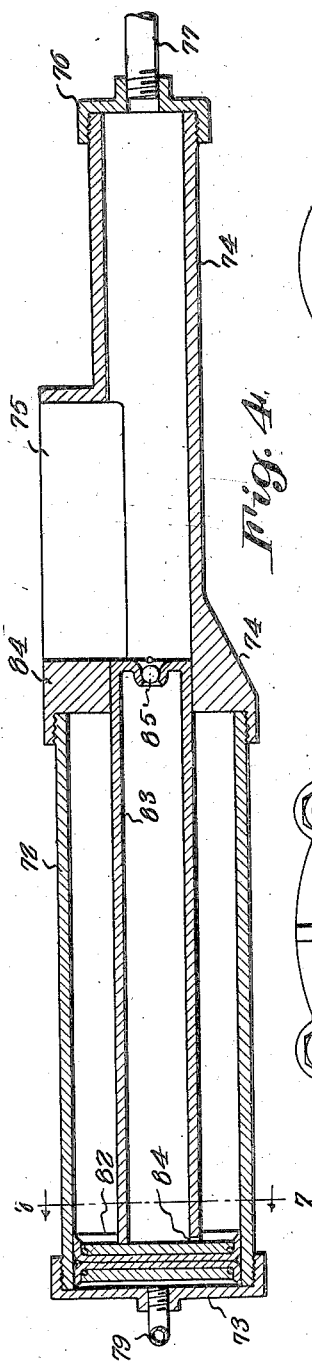
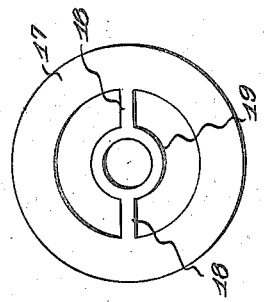
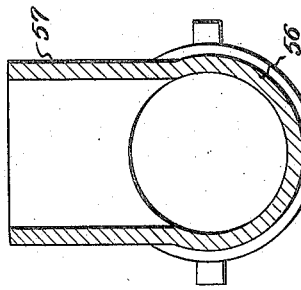
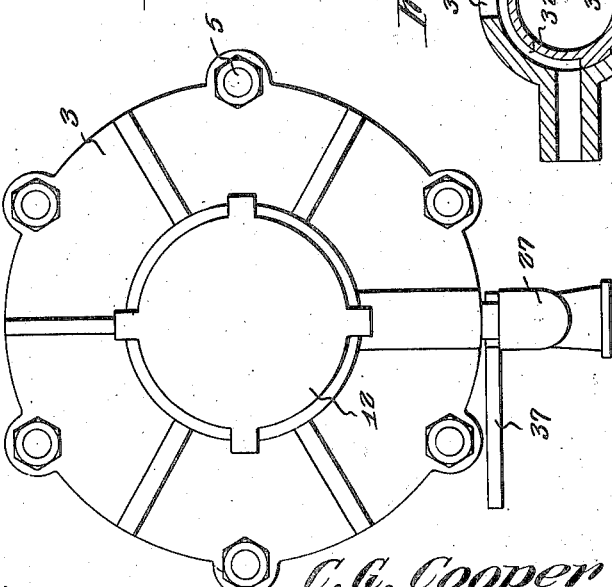
C. G. Cooper
AND Inventor
A. J. Dinkel
By C. A. Snow & Co.
Attorneys March 22, 1927. 1,621,657
C. G. COOPER ET AL
GREASE GUN
Filed July 14, 1924    3 Sheets-Sheet 3
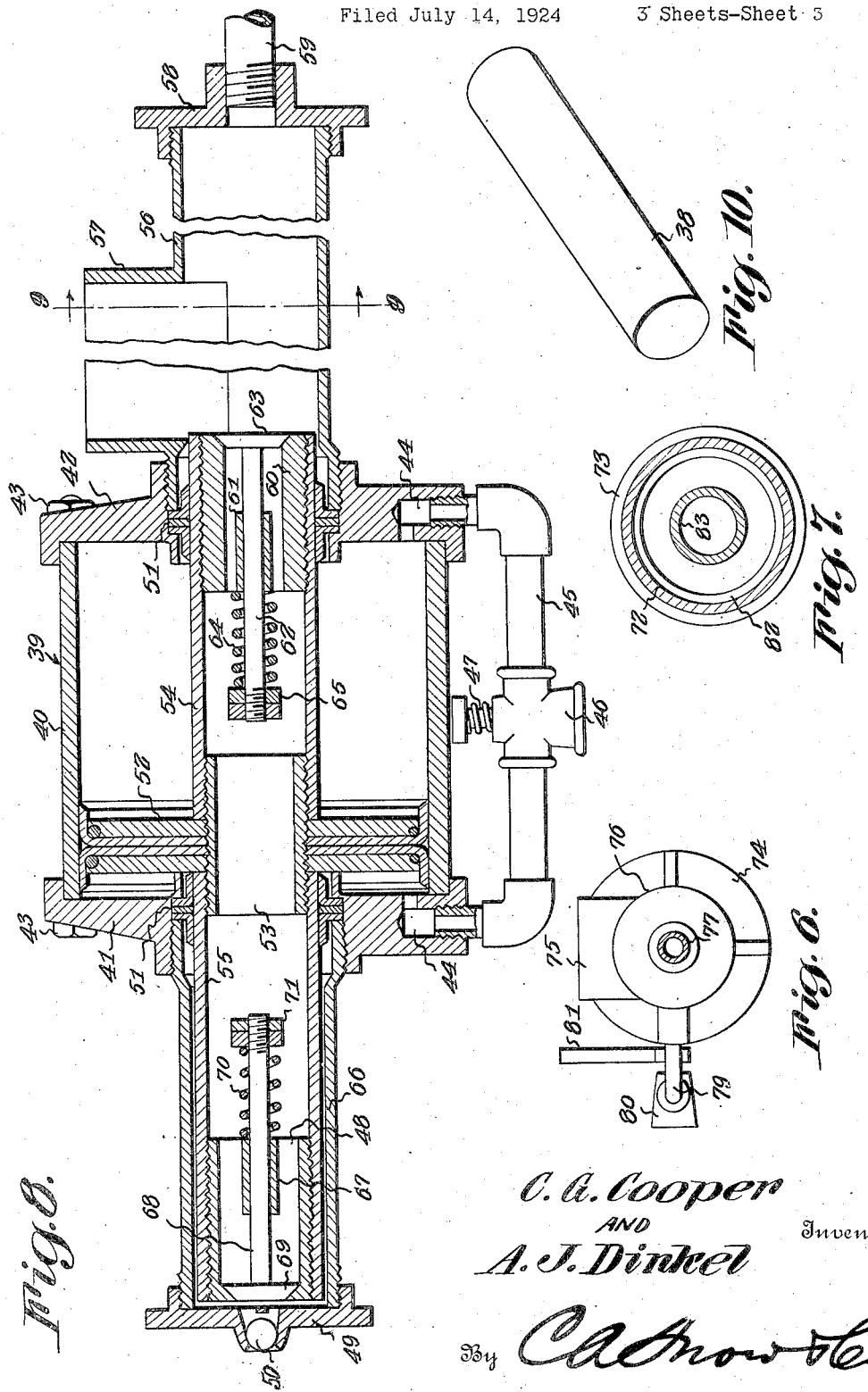

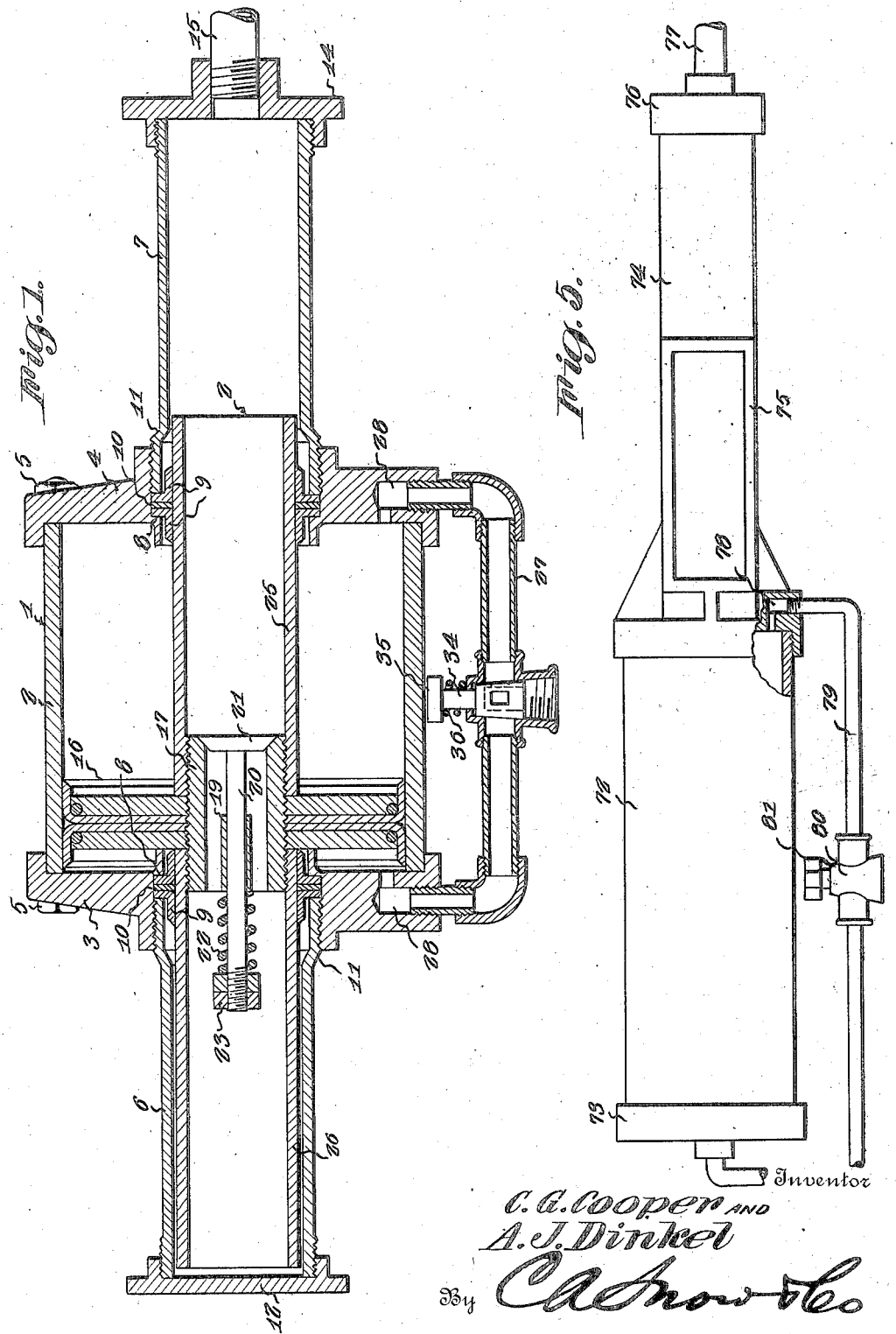

Patented Mar. 22, 1927.

1,621,657

UNITED STATES PATENT OFFICE.

CHARLES G. COOPER AND ANDREW J. DINKEL, OF YUMA, ARIZONA.

GREASE GUN.

Application filed July 14, 1924. Serial No. 725,963.

This invention aims to provide a gun out of which grease may be fed by fluid pressure, for lubrication, the gun being so constructed that it may be loaded with grease at the forward end or at the rear end, in the various embodiments of the invention.

Although preferred forms have been shown, it will be understood that a mechanic, working within the scope of what is claimed, may make changes, without departing from the spirit of the invention.

In the drawings:—Figure 1 shows in longitudinal section, one form of the invention; Figure 2 is an end elevation of the device depicted in Figure 1; Figure 3 is an end view of the coupling and valve seat; Figure 4 is a longitudinal section showing a modification; Figure 5 is a top plan of the device shown in Figure 4; Figure 6 is an end elevation of the device delineated in Figure 4; Figure 7 is a section taken on the line 7—7 of Figure 4; Figure 8 is a logitudinal section showing a modification, parts being broken away; Figure 9 is a section on the line 9—9 of Figure 8; Figure 10 is a perspective view of the slug of grease adapted to be used in any of the guns; Figure 11 is a sectional view illustrating one form of valve which may be used to control the admission of the fluid pressure to the ends of the cylinder.

Referring to Figures 1, 2, 3, 10 and 11, the device includes a cylinder 1 made up of a shell 2, and heads 3 and 4 secured at 5 to the opposite ends of the shell. The cylinder 1 includes a tubular extension 6 threaded into the head 3, and a tubular extension 7 threaded into the head 4, the heads having internal shoulders 8. Pairs of packing rings 9 are located in the heads 3 and 4, a metal spacer 10 being interposed between the rings of each pair, the packing rings and the spacers being bound together, against the shoulders 8 by the inner ends of the extensions 6 and 7, the extensions being offset as at 11, to receive the outermost packing rings 9. An imperforate cap 12 is threaded on the end of the extension 6. A cap 14 is threaded on the end of the extension 7 and has an outlet 15 through which the grease is delivered to the point of use.

A piston 16 is mounted for reciprocation in the shell 2 of the cylinder 1 and is threaded on a combined coupling and valve seat 17, of tubular form, the member 17 having, as shown in Figure 3, internal arms 18 supporting a bearing 19 in which slides the stem 20 of a valve 21 adapted to cooperate with one end of the member 17. There are superposed nuts 23 on the valve stem 20, a compression spring 22 surrounding a portion of the valve stem and abutting against one of the nuts 23 and against the bearing 19, to hold the valve 21 closed. The numeral 24 denotes a two-part hollow piston rod which is slidable in the packing rings 9, the piston rod being made up of tubular members 25 and 26, the said members being threaded at their inner ends on the coupling 17, and engaging the piston 16 to hold the same against rotation on the coupling 17. The tubular member 25 of the piston is adapted to operate in the cylinder extension 7, and the tubular member 26 of the piston is adapted to operate in the cylinder extension 6.

The numeral 27 marks a U-shaped fluid pressure conduit communicating at its ends with ports 28 located in the heads 3 and 4 and opening into the shell 2 of the cylinder, on opposite sides of the piston 16. Any suitable means may be provided for controlling the flow of fluid pressure through the conduit 27. If desired, a valve casing 29 may be interposed in the conduit 27, a hollow valve 30 being journaled in the casing. As disclosed in Figure 11, the valve 30 may be equipped with inlet ports 31 and with a circumferential exhaust port 32, the valve casing 29 having an exhaust port 33. The valve 30 has a stem 34 provided with a head 35, a compression spring 36 being disposed about the stem 34, between the casing 29 and the head 35, the function of the spring being to hold the valve 30 seated for rotation in the casing 29. A handle 37 on the valve stem 34 constitutes means whereby the valve may be operated.

Owing to the simple construction of the valve, and since any mechanical equivalent may be substituted for the valve, the operation of the valve may be dismissed with the brief statement that by means of the valve, fluid pressure may be admitted into each end of the cylinder shell 2, at the will of an operator, to secure a reciprocation of the piston 16 and the hollow piston rod 24.

Let it be supposed that the tubular member 26 of the piston rod is filled with grease, and that the piston 16 with the parts 26 and 25 have moved to the right in Figure 1. Then the cap 12 is removed and a slug 38 of grease (Figure 10) is placed in the extension 6, the cap 12 being replaced. Then, when the piston 16 and parts carried thereby move to the left into the position shown in Figure 1, the new charge of grease will force out of the member 26, the grease which is already therein, the valve 21 opening, to permit the passage of the grease into the member 25. When the piston 16 and parts carried thereby move to the right in Figure 1, the valve 21 is closed, and the grease, ultimately, is forced through the outlet 15, it being understood, of course, that the operation above described may have to be carried out a few times until the gun is sufficiently charged with grease so that when the slug 38 of grease is inserted into the extension 6, as above explained, and when the piston 16 moves to the right, there will be enough grease in the gun so that a part of the grease will be forced to move through the outlet 15, as hereinbefore explained.

In the form shown in Figures 8 and 9, many parts previously described are used, the gun being converted into a front loading gun. Owing to the similarity between the devices shown in Figures 1 and 8, a portion of the description of the structure delineated in Figure 8 may be reduced practically to a catalogue of parts, the cylinder appearing at 39 and including a shell 40 and heads 41 and 42 connected at 43 to the shell, the heads having ports 44 communicating with the fluid pressure conduit 45, the valve casing appearing at 46 and the valve 47 being of the sort hereinbefore described. One extension of the cylinder is marked by the numeral 48 and carries a cap 49 provided with an inwardly opening ball valve 50. The packing 51 for the piston rod is of the kind shown at 9—10 in Figure 1. The piston 52 is threaded on a coupling 53 corresponding in some respects to the coupling 17, the members of the hollow piston rod being shown at 54 and at 55 and being threaded on the coupling 53 to retain the piston 52.

In the place of the extension 7 of Figure 1 there is provided a tubular extension 56 of any desired length, threaded into the head 42, and provided, adjacent to the head, with a hopper 57 adapted to receive the slug 38 of grease shown in Figure 10. A cap 58 is threaded on the extension 56 and has an outlet 59 whereby the grease is conducted to the point of application.

A tubular valve seat 60 is threaded into the forward end of the piston rod member 54 and has an internal guide 61 in which reciprocates the stem 62 of a valve 63 held seated on the forward end of the member 60 by a compression spring 64 disposed about a portion of the stem 62, one end of the spring abutting against the guide or bearing 61, and the other end of the spring cooperating with superposed nuts 65 on the inner end of the stem 62. A tubular valve seat 66 is threaded into the outer end of the member 55 of the hollow piston rod and has an internal guide or bearing 67 in which reciprocates the stem 68 of a valve 69 adapted to seat outwardly against the member 66 under the action of a retractile spring 70 extended between the bearing or guide 67 and nuts 71 on the stem 68.

When the piston 52 and parts carried thereby move to the right in Figure 8, the grease will be forced out of the tubular extension 56 through the outlet 59, the valve 63 being closed, grease being supplied through the hopper 57 as hereinbefore explained. When the piston 52 and parts carried thereby move to the right in Figure 8, the valve 50 opens and admits air, to prevent a partial vacuum in the left hand end of the extension 48. When the piston 52 and parts carried thereby move to the left, the valves 69 and 63 open, thereby admitting air into the member 56 and preventing the grease from being sucked back through the outlet 59.

Referring to the form shown in Figures 4, 5, 6 and 7, the cylinder appears at 72 and is provided at its rear end with a head 73. A tubular extension 74 is threaded on the forward end of the cylinder and has a hopper 75, there being a cap 76 on the forward end of the part 74, the cap being supplied with an outlet 77 through which the grease passes to the point of application. A port 78 is formed in the rear end of the extension 74 and communicates with one end of the cylinder 72. A fluid or air pressure conduit 79 communicates with the port 78 and communicates with the opposite end of the cylinder 72, through the head 73. A valve casing 80 is interposed in the conduit 79 and carries a valve 81 of the sort hereinbefore described. The piston which reciprocates in the cylinder 72 is marked by the numeral 82 and is carried by a hollow rod 83 slidable in the base 84 of the extension 74, the hollow piston rod 83 having an opening at one end, marked by the numeral 84 and located adjacent to the piston 82. At the opposite end of the hollow member 83 there is a valve 85 which closes inwardly.

When the piston and the member 83 are advanced, grease will be forced through the extension 74 and the outlet 77, grease being supplied through the hopper 75. When the parts 82 and 83 move to the left in Figure 4, the fluid in the cylinder 72 will flow, to some extent, through the opening 84, the valve 85 unseating, and suction being relieved in the extension 74 whilst the forward end of the member 83 is moving from the cap 76 to the forward end of the hopper 75, the result being that the grease is not sucked back through the outlet 77.

What is claimed is:—

1. In a device of the class described, a cylinder including heads having internal shoulders, reduced extensions removably mounted in the heads, one of the extensions having means for admitting grease, and one of the extensions having a grease outlet, packings engaged between the shoulders and the ends of the extensions, alined tubular members slidable in the packings and movable in the extensions, a coupling connecting the inner ends of the tubular members detachably, a piston slidable in the cylinder and mounted on the coupling, the piston being bound between the tubular members, a valve movably supported by the coupling, the coupling forming a seat for the valve, and means for admitting fluid pressure to the cylinder upon opposite sides of the piston to secure a reciprocation of the piston and the tubular members.

2. In a device of the class described, a cylinder including heads having internal shoulders, reduced extensions mounted removably in the heads, one of the extensions having means for admitting grease, and one of the extensions having a grease outlet, packings engaged between the shoulders and the ends of the extensions alined tubular members slidable in the packings and movable in the extensions, a coupling connecting the inner ends of the tubular members detachably, a piston slidable in the cylinder and mounted on the coupling, the piston being bound between the tubular members, a valve closing when the piston moves toward the grease outlet and controlling the bore of the tubular members, means for mounting the valve to move along with the tubular members, and means for admitting fluid pressure to the cylinder upon opposite sides of the piston, to secure a reciprocation of the piston and the tubular members.

3. In a device of the class described, a cylinder, reduced extensions mounted in the heads of the cylinder, one of the extensions having means for admitting grease, and one of the extensions having a grease outlet, alined tubular members movable in the extensions, a coupling connecting the inner ends of the tubular members, detachably, a piston slidable in the cylinder and mounted on the coupling, the piston being bound between the tubular members, a valve movably supported by the coupling, the coupling forming a seat for the valve, and means for admitting fluid pressure to the cylinder upon opposite sides of the piston to secure a reciprocation of the piston and the tubular members.

4. In a device of the class described, a cylinder, reduced extensions mounted in the heads of the cylinder, one of the extensions having means for admitting grease, and one of the extensions having a grease outlet, alined tubular members movable in the extensions, a coupling connecting the inner ends of the tubular members, detachably, a piston slidable in the cylinder and mounted on the coupling, the piston being bound between the tubular members, a valve closing when the piston moves toward the grease outlet and controlling the bore of the tubular members, means for mounting the valve to move along with the tubular members, and means for admitting fluid pressure through the cylinder upon opposite sides of the piston to secure a reciprocation of the piston and the tubular members.

In testimony that we claim the foregoing as our own, we have hereto affixed our signatures.

CHARLES G. COOPER.
ANDREW J. DINKEL.